United States Patent
Zarco

(10) Patent No.: US 10,899,384 B2
(45) Date of Patent: Jan. 26, 2021

(54) TRAILER REVERSE ASSIST WITH FOLLOW-ME SYSTEM

(71) Applicant: Continental Automotive Systems, Inc., Auburn Hills, MI (US)

(72) Inventor: Alejandro Salcido Zarco, Troy, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 212 days.

(21) Appl. No.: 16/020,341

(22) Filed: Jun. 27, 2018

(65) Prior Publication Data
US 2019/0016382 A1 Jan. 17, 2019

Related U.S. Application Data

(60) Provisional application No. 62/532,170, filed on Jul. 13, 2017.

(51) Int. Cl.
*B62D 13/06* (2006.01)
*G05D 1/02* (2020.01)
(Continued)

(52) U.S. Cl.
CPC ........... *B62D 13/06* (2013.01); *B62D 13/005* (2013.01); *B62D 15/0285* (2013.01);
(Continued)

(58) Field of Classification Search
CPC .. B62D 13/06; B62D 13/005; B62D 15/0285; G05D 1/0038; G05D 1/0088; G05D 1/0212; G05D 2201/0213
(Continued)

(56) References Cited

U.S. PATENT DOCUMENTS

| 7,154,385 B2 | 12/2006 | Lee et al. |
| 2007/0090688 A1* | 4/2007 | Haemmerling ........ B62D 13/06 303/7 |

(Continued)

OTHER PUBLICATIONS

Pradalier, et al., "Robust Trajectory Tracking for a Reversing Tractor Trailer", Journal of Field Robotics, 2008, pp. 378-399, vol. 25(6-7), Published online in Wiley InterScience (www.interscience.wiley.com).

(Continued)

*Primary Examiner* — Krishnan Ramesh

(57) ABSTRACT

A method for maneuvering a vehicle-trailer system in a reverse direction is provided. The method includes receiving images from a camera positioned on a rear portion of the trailer. The method includes: identifying one or more guide representations within the received images; and transmitting the received images to a user interface. The method also includes receiving from the user interface, an indication of a guide representation from the one or more guide representations. The method includes determining a path that includes maneuvers configured to move the vehicle-trailer system along the path to follow the guide associated with the identified guide representation while maintaining a minimum distance from the guide positioned behind the trailer. The method also includes transmitting to a drive system of the vehicle, one or more commands causing the vehicle-trailer system to autonomously move the vehicle-trailer system along the vehicle-trailer path in the reverse direction.

12 Claims, 5 Drawing Sheets

(51) Int. Cl.
  *B62D 13/00* (2006.01)
  *G05D 1/00* (2006.01)
  *B62D 15/02* (2006.01)

(52) U.S. Cl.
  CPC ......... *G05D 1/0038* (2013.01); *G05D 1/0088* (2013.01); *G05D 1/0212* (2013.01); *G05D 2201/0213* (2013.01)

(58) Field of Classification Search
  USPC .......................................................... 701/23
  See application file for complete search history.

(56) References Cited

U.S. PATENT DOCUMENTS

| | | | |
|---|---|---|---|
| 2012/0185131 A1 | 7/2012 | Headley | |
| 2014/0358424 A1* | 12/2014 | Lavoie | B60D 1/62 |
| | | | 701/428 |
| 2016/0071418 A1* | 3/2016 | Oshida | B60W 30/165 |
| | | | 701/23 |
| 2016/0280258 A1* | 9/2016 | Lavoie | B62D 6/10 |
| 2017/0113722 A1* | 4/2017 | Lavoie | G08G 1/168 |
| 2017/0225702 A1* | 8/2017 | Yamada | B62D 15/02 |
| 2017/0297621 A1* | 10/2017 | Bunderson | G05D 1/0217 |
| 2018/0057052 A1* | 3/2018 | Dodd | B60D 1/015 |
| 2018/0215382 A1* | 8/2018 | Gupta | B60W 30/09 |
| 2018/0346029 A1* | 12/2018 | Kabos | G05D 1/0225 |
| 2018/0362026 A1* | 12/2018 | Heimberger | B60W 30/0953 |
| 2019/0001987 A1* | 1/2019 | Kim | B60W 40/06 |

OTHER PUBLICATIONS

Olof Enqvist, "AFS-Assisted Trailer Reversing", Linköpings University Department of Electrical Engineering, Jan. 27, 2006.

\* cited by examiner

TRAILER REVERSE ASSIST WITH FOLLOW-ME SYSTEM

CROSS REFERENCE TO RELATED APPLICATIONS

This U.S. patent application claims priority under 35 U.S.C. § 119(e) to U.S. Provisional Application 62/532,170 filed on Jul. 13, 2017, which is hereby incorporated by reference in its entirety.

TECHNICAL FIELD

This disclosure relates to a vehicle system having a vehicle and a trailer system configured to autonomously maneuver rearward while following a guide. The vehicle includes a trailer reverse assist system with a follow-me system.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, semi-trailer, among others. The tow vehicle may be a car, a crossover, a truck, a semi-truck, a van, a sports-utility-vehicle (SUV), a recreational vehicle (RV), or any other vehicle configured to attach to the trailer and pull the trailer. The trailer may be attached to a powered vehicle using a trailer hitch. The trailer hitch allows the trailer to swivel horizontally with respect to the vehicle so that the vehicle-trailer unit is able to move around corners. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to receive a feed from the powered vehicle's rear light circuit, allowing the trailer to have taillights, turn signals, and brake lights that are in-sync with the powered vehicle's lights.

Some of the challenges that face tow vehicle drivers is backing up to a specific location while being attached to the trailer because more than one person may be needed to maneuver the tow vehicle backwards towards the specific location. Since the vehicle-trailer unit swivels around the hitch horizontally allowing the vehicle-trailer unit to move around corners, when the vehicle backs up, it pushes the trailer. Therefore, in certain situations, it is important that the trailer moves straight rearwards or along an intended path, for example, when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course. Therefore, oftentimes, one person drives the vehicle, e.g., the driver, and another one or more people are needed to view the tow vehicle and the trailer and provide the driver with directions regarding the path that the tow vehicle has to take. In some instances, the people providing directions to the driver may have difficulty providing efficient instructions for directing the path of the tow vehicle. Moreover, the driver may not be properly trained and/or may not have enough experience to back-up the tow vehicle and the trailer. In some examples, even trained drivers may struggle with backing up the tow vehicle while attached to the trailer because the trailer may have unfamiliar dimensions or is not easily maneuvered. Other difficulties may arise while backing up the tow vehicle and the trailer, because the driver may have blind zones that do not allow adequate sight angles to properly back up the tow vehicle and the trailer.

Recent advancements in sensor technology have led to improved safety systems for vehicles. Arrangements and methods for detecting and avoiding collisions are becoming available. Sensors and cameras located on the vehicle and the trailer may be used to alert a driver of possible obstacles when the vehicle is traveling in a forward direction or a rearward direction. Therefore, it is desirable to provide a vehicle-trailer system that includes sensors to overcome the challenges faced by drivers of tow vehicles.

SUMMARY

One aspect of the disclosure provides a method for maneuvering a vehicle-trailer system in a reverse direction. The vehicle-trailer system includes a vehicle attached to a trailer at a hitch. The method includes receiving, at data processing hardware, one or more images from a camera in communication with the data processing hardware and positioned on a rear portion of the trailer. The method also includes identifying, using the data processing hardware, one or more guide representations within the one or more received images. The method includes transmitting, from the data processing hardware to a user interface in communication with the data processing hardware, the one or more received images. The method also includes receiving, at the data processing hardware from the user interface, an indication of a guide representation from the one or more guide representations. The method includes determining, at the data processing hardware, a vehicle-trailer path comprising maneuvers configured to move the vehicle-trailer system along the vehicle-trailer path to follow the guide associated with the identified guide representation while maintaining a minimum distance from the guide positioned behind the trailer. In addition, the method includes transmitting, from the data processing hardware to a drive system of the vehicle, one or more commands causing the vehicle-trailer system to autonomously move the vehicle-trailer system along the vehicle-trailer path in the reverse direction.

Implementations of this aspect of the disclosure may include one or more of the following optional features. In some implementations, the method includes receiving, at the data processing hardware, vehicle sensor data from one or more vehicle sensors positioned on a back portion of the vehicle. The sensor data is indicative of a distance between the rear portion of the vehicle and a front portion of the trailer. The method may also include determining, using the data processing hardware, a vehicle-trailer angle (i.e., a trailer articulation angle) indicative of an angle between the vehicle and the trailer based on the received sensor data. In some examples, determining the vehicle-trailer path includes: determining a guide trailer angle being an angle between a fore-aft axis of the trailer and the guide and determining a position of the guide being at a minimum distance away from the trailer. Determining the vehicle-trailer path may also include determining the vehicle-trailer path based on the guide trailer angle, the vehicle-trailer angle, and the minimum distance.

In some implementations, the method includes receiving, at the data processing hardware, trailer sensor data from one or more trailer sensors positioned on the rear portion of the trailer, side portions of the trailer, or the rear and side portions of the trailer. The method may also include: identifying, using the data processing hardware, one or more objects within the determined vehicle-trailer path using the received trailer sensor data; and when one or more objects are identified, adjusting the determined vehicle-trailer path to avoid the one or more objects. In some examples, adjusting the determined vehicle-trailer path to avoid the one or more objects includes: determining an adjusted vehicle-trailer path that includes maneuvers configured to move the vehicle-trailer system along the vehicle-trailer path while maintaining the minimum distance from the guide positioned behind the trailer and avoiding the one or more identified objects.

In some implementations, the method further includes: determining, using the data processing hardware, a guide speed of the guide using the received one or more images; and determining, using the data processing hardware, a vehicle-trailer speed to maintain a minimum distance away from the guide. The method may also includes transmitting, from the data processing hardware, one or more commands to the drive system of the vehicle causing the vehicle-trailer system to adjust a current vehicle-trailer speed to the determined vehicle-trailer speed along the determined vehicle-trailer path in the reverse direction.

Another aspect of the disclosure provides a system for maneuvering a vehicle-trailer system in a reverse direction. The vehicle-trailer system includes a vehicle attached to a trailer at a hitch point. The system includes data processing hardware and hardware memory in communication with the data processing hardware. The hardware memory stores instructions that when executed on the data processing hardware cause the data processing hardware to perform operations. The operations include: receiving one or more images from a camera in communication with the data processing hardware and positioned on a rear portion of the trailer; identifying one or more guides within the one or more received images; and transmitting to a user interface in communication with the data processing hardware, the one or more received images. The operations further include: receiving an indication of an identified guide from the one or more identified guides; and determining a vehicle-trailer path that includes maneuvers configured to move the vehicle-trailer system along the vehicle-trailer path to the guide associated with the identified guide representation while maintaining a minimum distance from the guide positioned behind the trailer. The operations further include transmitting one or more commands to a drive system of the vehicle. The one or more commands causing the vehicle-trailer system to autonomously move the vehicle-trailer system along the determined path in the reverse direction.

Implementations of this aspect of the disclosure may include one or more of the following optional features. In some implementations, the operations further include receiving vehicle sensor data from one or more vehicle sensors positioned on a back portion of the vehicle. The sensor data indicative of a distance between the rear portion of the vehicle and a front portion of the trailer. The operations further include determining a vehicle-trailer angle indicative of an angle between the vehicle and the trailer. In some examples, determining the vehicle-trailer path includes: determining a guide trailer angle being an angle between a fore-aft axis of the trailer and the guide; determining a position of the guide being at a minimum distance away from the trailer; and determining the vehicle-trailer path based on the guide trailer angle, the vehicle-trailer angle, and the minimum distance.

In some implementations, the operations further include: receiving trailer sensor data from one or more trailer sensors positioned on the rear portion of the trailer, side portions of the trailer, or the rear and side portions of the trailer; identifying one or more objects within the determined path; and when one or more objects are identified, adjusting the determined vehicle-trailer path to avoid the one or more objects. adjusting the determined vehicle-trailer path to avoid the one or more objects may include determining an adjusted vehicle-trailer path that includes maneuvers configured to move the vehicle-trailer system along the vehicle-trailer path while maintaining the minimum distance from the guide positioned behind the trailer and avoiding the one or more identified objects.

In some examples, the operations further include: determining a guide speed of the guide using the received one or more images; determining a vehicle-trailer speed based on the guide speed to maintain a minimum distance away from the guide; and transmitting one or more commands to the drive system of the vehicle causing the vehicle-trailer system to adjust a current vehicle-trailer speed to the determined vehicle-trailer speed along the determined path in the reverse direction.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a semi-truck, a van, a sports-utility-vehicle (SUV), and a recreational vehicle (RV) may be configured to tow a trailer. The tow vehicle connects to the trailer by way of a trailer hitch. It is desirable to have a vehicle-trailer system that can autonomously back-up to a specific location while following a guide (i.e., a person), thus eliminating the need for a driver to drive the vehicle-trailer system in a rearward direction while another one or more people provide the driver with directions regarding the path that the vehicle-trailer system has to take. As such, a vehicle-trailer system with a follow-me system provides a driver with a safer and faster experience when backing up to a specific location. In some examples, the vehicle-trailer system may receive an indication from the driver via a user interface indicating which guide to follow when the vehicle-trailer system detects more than one guide. Therefore, it is desirable to have a vehicle-trailer system that detects objects while autonomously driving rearwards, improves autonomous maneuverability in tight spots while driving rearwards, and provides added visibility to the driver by having a camera behind the trailer.

Figure 1A:
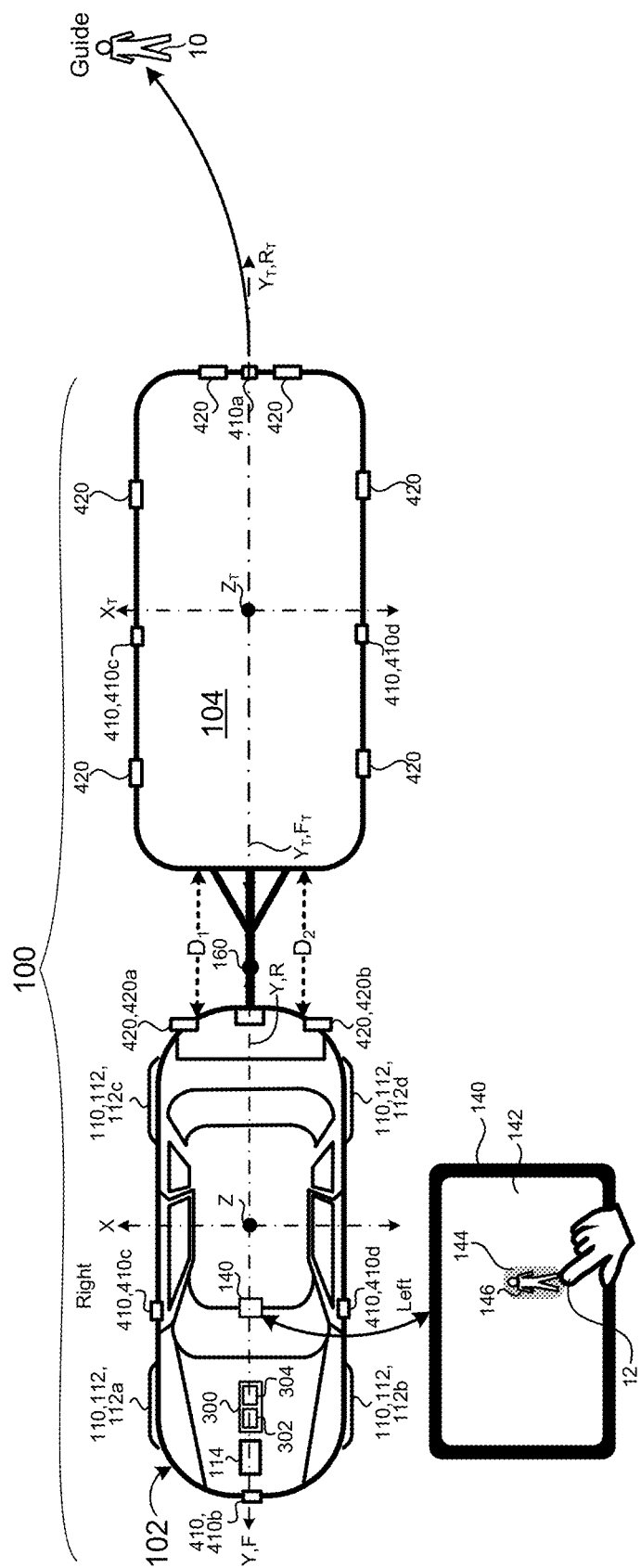
FIG. 1A is a schematic view of an exemplary vehicle-trailer system having a user interface displaying an indication of a guide behind the vehicle-trailer system.
Figure 2:
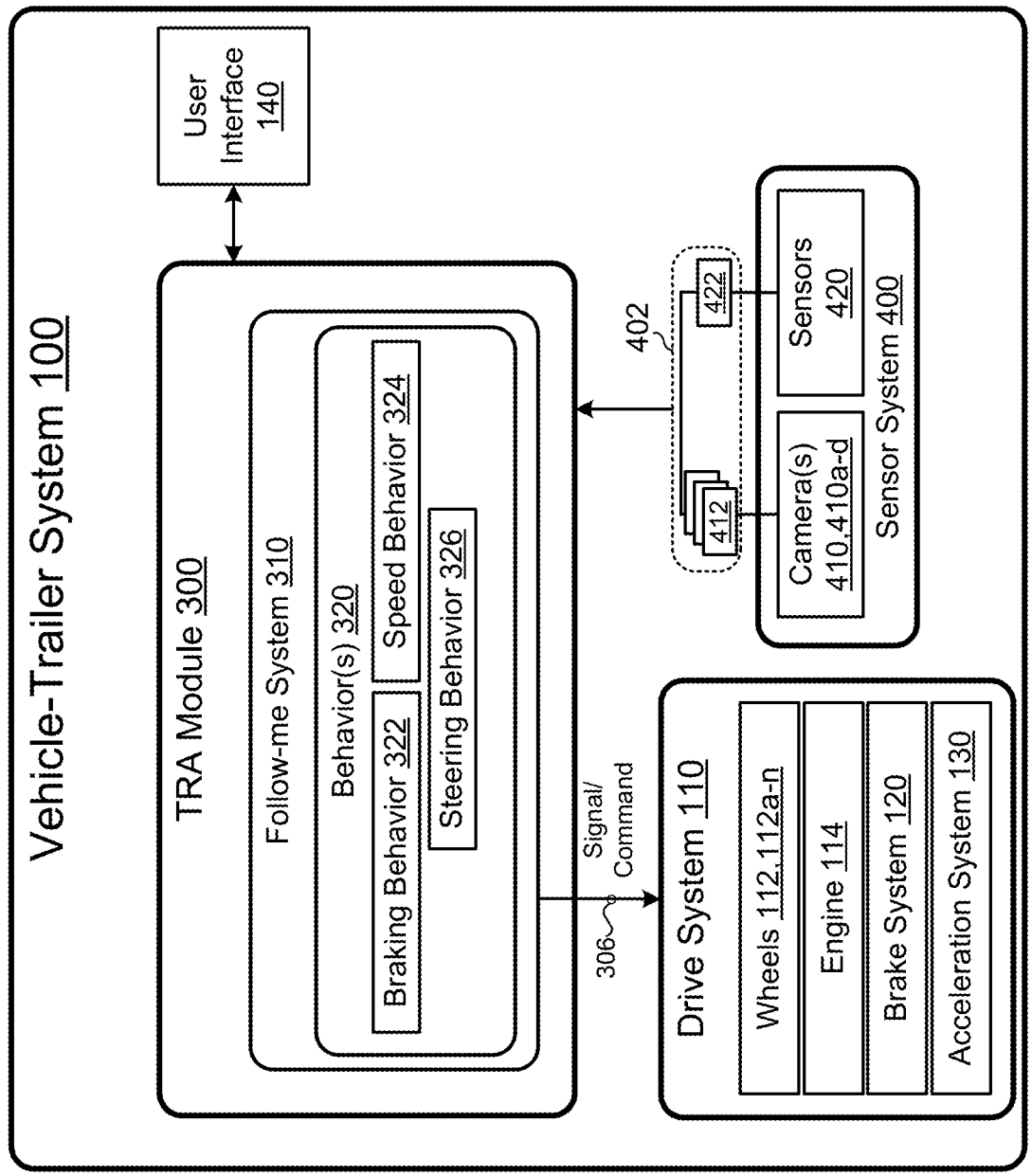
FIG. 2 is a schematic view of an exemplary vehicle-trailer system.

Referring to FIGS. 1A and 2, in some implementations, a vehicle-trailer system 100 includes a vehicle 102 hitched to a trailer 104. A driver of the vehicle-trailer system 100 may want to drive rearward to a specific location. The vehicle-trailer system 100 may be configured to receive an indication of a driver selection 144 via a user interface 140 of the vehicle 102 to follow a guide 10, i.e., a person walking behind the trailer 104. Once the vehicle-trailer system 100 receives the indication, then the vehicle-trailer system autonomously follows the guide 10.

The vehicle-trailer system 100 may include a drive system 110 associated with the tow vehicle 102 that maneuvers the vehicle-trailer system 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 may include an engine 114 that converts one form of energy into mechanical energy allowing the vehicle 102 to move. The engine 114 may be a heat engine that burns a fuel to create heat, which is then used to create a force, or an electric engine that converts electrical energy into mechanical motion. Other types of engines may also be used. The drive system 110 includes other components (not shown) that are in communication with and connected to the wheels 112 and engine 114 and that allow the vehicle 102 to move, thus moving the trailer 104 as well. The drive system 110 may also include a brake system 120 that includes brakes (not shown) associated with each wheel 112, 112a-d, where each brake is associated with a wheel 112a-n and is configured to slow down or stop the wheel 112a-n from rotating. The vehicle-trailer system 100 may also include an acceleration system 130 that is configured to adjust a speed and direction of the vehicle-trailer system 100. The vehicle-trailer system 100 may include other systems.

The tow vehicle 102 may move across the road surface by various combinations of movements relative to three mutually perpendicular axes defined by the tow vehicle 102: a transverse axis X, a fore-aft axis Y, and a central vertical axis Z. The transverse axis x, extends between a right side R and a left side of the tow vehicle 102. A forward drive direction along the fore-aft axis Y is designated as F, also referred to as a forward motion. In addition, an aft or rearward drive direction along the fore-aft direction Y is designated as R, also referred to as rearward motion. In some examples, the tow vehicle 102 includes a suspension system (not shown), which when adjusted causes the tow vehicle 102 to tilt about the X axis and or the Y axis, or move along the central vertical axis Z. As the tow vehicle 102 moves, the trailer 104 follows along a path of the tow vehicle 102. Therefore, when the tow vehicle 102 makes a turn as it moves in the forward direction F, then the trailer 104 follows along. While turning, the tow vehicle 102 and the trailer 104 have a turn angle (e.g., trailer articulation angle $\alpha_T$) between one another about a trailer hitch 160 connecting the tow vehicle 102 and the trailer 104 together.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$, extends between a right side R and a left side of the trailer 104. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the vehicle 102 along its transverse axis X, fore-aft axis Y, and central vertical axis Z, and movement of the trailer 104 along its trailer transverse axis $X_T$, trailer fore-aft axis $Y_T$, and trailer central vertical axis $Z_T$.

The vehicle-trailer system 100 may include a sensor system 400 to provide reliable and robust autonomous driving. The sensor system 400 may include different types of sensors that may be used separately or with one another to create a perception of the tow vehicle's environment that is used for the vehicle-trailer system 100 to autonomously drive and make intelligent decisions based on objects and obstacles detected by the sensor system 400. The sensors may include, but not limited to, one or more imaging devices (such as cameras) 410, and sensors 420 such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) 410 and the sensor(s) 420 may be used to alert the driver of possible obstacles when the vehicle-trailer system 100 is traveling in the forward direction F or in the rearward direction R, by way of audible alerts and/or visual alerts via the user interface 140. Therefore, the sensor system 400 is especially useful for increasing safety in the vehicle-trailer system 100 which operate under semi-autonomous or autonomous conditions.

In some implementations, the vehicle-trailer system 100 includes a rear camera 410, 410a that is mounted on the trailer 104 to provide a view of a rear driving path for the vehicle-trailer system 100. In some examples, the rear camera 410a is activated when the driver is changing lanes to help the driver identify any vehicles behind the trailer 104 and/or when the driver is driving the vehicle-trailer system 100 in a rearward direction R. Moreover, in some examples, the vehicle-trailer system 100 (i.e., a trailer reverse assist (TRA) module 300) stores (in hardware memory 304) received images 412 from the rear camera 410a for use in a dispute over a rear collision between a vehicle and the trailer 104. In this case, the vehicle-trailer system 100 (i.e., the TRA module 300) may store the images for a specific period of time. Additionally, in some examples, the vehicle-trailer system 100 includes a front camera 410, 410b mounted on the vehicle 102 to provide a view of a front driving path of the vehicle-trailer system 100. The vehicle-trailer system 100 may include one or more right camera(s) 410, 410c positioned on the right side of the vehicle-trailer system 100, and one or more left camera(s) 410, 410d positioned on the left side of the vehicle-trailer system 100. The left and right cameras 410, 410c, 410d provide additional side views of the vehicle-trailer system 100. In this case, the vehicle-trailer system 100 may detect objects and obstacles positioned on either side of the vehicle-trailer system 100, in addition to the objects and obstacle detected along the front and rear driving paths. The camera(s) 410, 410a-d may be a monocular camera, binocular camera, or another type of sensing device capable of providing a view of the rear travelling path of the vehicle-trailer system 100.

The tow vehicle 102 may include a user interface 140, such as, a display. The user interface 140 receives one or more user commands from the driver via one or more input mechanisms or a touch screen display 142 and/or displays one or more notifications to the driver. The user interface 140 is in communication with a trailer reverse assist (TRA) module 300. In some examples, the user interface 140 displays an image of an environment of the vehicle-trailer system 100 leading to one or more commands being received by the user interface 140 (from the driver) that initiate execution of one or more behaviors 320, 320a-c. The vehicle TRA module 300 includes a computing device (or data processing hardware) 302 (e.g., central processing unit having one or more computing processors) in communication with non-transitory memory or hardware memory 304 (e.g., a hard disk, flash memory, random-access memory) capable of storing instructions executable on the computing processor(s)).

In some implementations, the rear camera 410, 410a of the trailer 104 transmits one or more captured images 412 to the TRA module 300. The TRA module 300 processes the received images 412 and identifies one or more representations 146 of guides 10 that are located behind the trailer 104. The TRA module 300 sends the images 412 received from the rear camera 410 to the user interface 140, which in turn displays the received images on a display 142 of the user interface 140. The driver may make a selection 144 of a guide representation 146 indicative of the guide 10 that the driver wants the vehicle-trailer system 100 to follow. Once the user interface 140 receives the driver selection of the guide representation 146, the user interface 140 communicates with the TRA module 300 indicating the driver's selection.

In some examples, first and second vehicle sensors 420a, 420b are located at the rear of the vehicle 102. The first and second vehicle sensors 420a, 420b measure a first distance $D_1$ and a second distance $D_2$ respectively between the rear of the vehicle 102 and the front of the trailer 104. As such, each one of the first and second sensors 420a, 420b measures the distance $D_1$, $D_2$ extending parallel to the fore-aft axis Y of the vehicle. The sensor data 422 is sent to the TRA module 300, which in turn compares the first and second measured distances $D_1$, $D_2$ associated with each one of the first and second sensors 420a, 420b and determines an angle (e.g., the trailer articulation angle $\alpha_T$) between the vehicle 102 and the trailer 104 about the hitch 160. In some examples, if the first distance $D_1$ is equal to the second distance $D_2$, then the vehicle 102 is considered to be aligned in a straight line with the trailer 104, for example, the vehicle fore-aft axis Y and the trailer fore-aft axis $Y_T$ are aligned. In other words, the vehicle-trailer system 100 extends along the vehicle fore-aft axis Y and/or the trailer fore-aft axis $Y_T$. In some examples, the first and second distances $D_1$, $D_2$ being equal is not indicative of the vehicle 102 and trailer 104 being aligned. Therefore, in some examples, the TRA module 300 learns over time, as the vehicle-trailer system 100 moves forward, what distances $D_1$, $D_2$ are indicative of a straight alignment of the vehicle 102 with respect to the trailer 104. Moreover, if the first distance $D_1$ is greater than the second distance $D_2$, then an angle on the left side of the vehicle-trailer system 100 is less than an angle on the right side of the vehicle-trailer system 100. In this case, in a forward driving direction F, the vehicle 102 is turning left and the trailer 104 is following the vehicle 102. If the first distance $D_1$ is less than the second distance $D_2$, then the angle on the left side of the vehicle-trailer system 100 is greater than the angle on the right side of the vehicle-trailer system 100. In this case, in a forward driving direction F, the vehicle 102 is turning right and the trailer 104 is following the vehicle 102. In some implementations, the TRA module 300 determines if the calculated angle (i.e., based on the first and second distances $D_1$, $D_2$) between the vehicle 102 and the trailer 104 is greater or less than a threshold range, then the TRA module 300 instructs the drive system 110 to adjust its wheel steering by a corrective steering angle to prevent jackknifing.

The vehicle TRA module 300 executes a follow-me system 310 configured to autonomously steer the vehicle-trailer system 100 along a path to follow a guide 10. The follow-me system 310 may be initiated when the driver puts the vehicle in reverse or presses a button indicating the driver's intent to drive rearwards. The follow-me system 310 receives an indication of a selection 144 of a guide representation 146 from the driver via the user interface 140 and executes one or more behaviors 320, 320a-320c that send commands 306 to the drive system 110, leading to the vehicle-trailer system 100 autonomously following the guide 10 in a rearward direction R.

The behaviors 320, 320a-320c include a braking behavior 320a, a speed behavior 320b, and a steering behavior 320c. Other behaviors may also be available to aid the vehicle-trailer system 100 to autonomously maneuver in the reverse direction. Each behavior 320, 320a-320c causes the vehicle-trailer system 100 to take an action, such as driving backward, turning at a specific angle, breaking, speeding, slowing down, among others. The TRA module 300 may maneuver the vehicle-trailer system 100 in any direction across the road surface by controlling the drive system 110, more specifically by issuing commands 306 to the drive system 110. For example, the vehicle TRA module 300 may maneuver the vehicle-trailer system 100 from an initial position (not shown) to a final position (not shown).

In some implementations, the TRA module 300, in communication with the sensor system 400, receives the one or more images 412 captured by the camera(s) 410, 410a-d (for example, the rear camera 410a) and analyzes the received images 412 to identify one or more guides 10 within the received images 412. In addition, the TRA module 300 determines the location of the one or more guides 10 based on the received data 402, including the received images 412 and/or the received sensor data 422, and continuously plans a path towards the guide 10 as the guide 10 is moving.

Figure 1B:
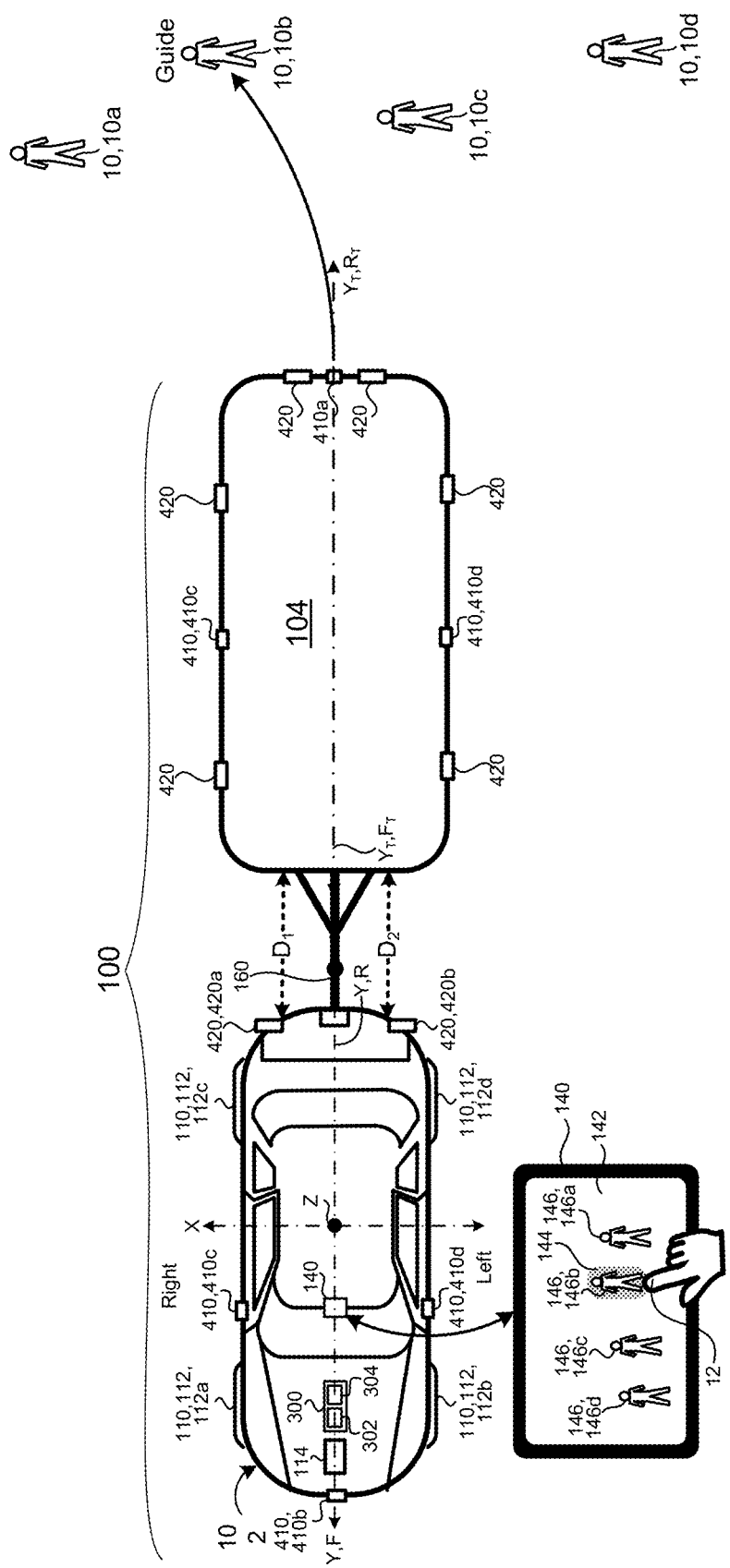
FIG. 1B is a schematic view of an exemplary vehicle-trailer system having a user interface displaying indications of a plurality of guides behind the vehicle-trailer system.

The TRA module 300 receives sensor system data 402 (including images 412 and/or sensor data 422) and based on the received data 402 provides an image output to the user interface 140. The TRA module 300 analyzes the image 412 and identifies one or more guides 10 in the received image 412. The TRA module 300 may also receive sensor data 420 from the sensors 420 in communication with the TRA module 300, and analyze the received sensor data 420. Based on the analyzed images 412 (or the analyzed images 412 and the sensor data 422), the TRA module 300 identifies the location of each identified guide 10 relative to the vehicle-trailer system 100, for example, by way of a coordinate system. As such, the TRA module 300 displays on the user interface 140 the received images 412 that include representations 146, 146a-c of the identified one or more guides 10, 10a-c located at a distance behind the vehicle-trailer system 100. As shown in FIG. 1B, first, second, third, and fourth guides 10, 10a-d are positioned behind the vehicle-trailer system 100. As such, the user interface 140 displays first, second, third, and fourth guide representations 146, 146a-d associated with the first, second, third, and fourth guides 10, 10a-d respectively.

The driver may select one of the guide representations 146, 146a-d indicating that the driver wants the vehicle-trailer system 100 to autonomously drive towards the guide 10 associated with the selected guide representation 146, i.e., the driver selection 144. In some examples, the user interface 140 is a touch screen display 142; as such, the driver may point his finger 12 and select the desired guide representation 146, 146a-d. In other examples, the user interface 140 is not a touchscreen and the driver may use an input device (not shown), such as, but not limited to, a rotary knob or a mouse to select the desired guide representation 146, 146a-d.

Figure 1C:
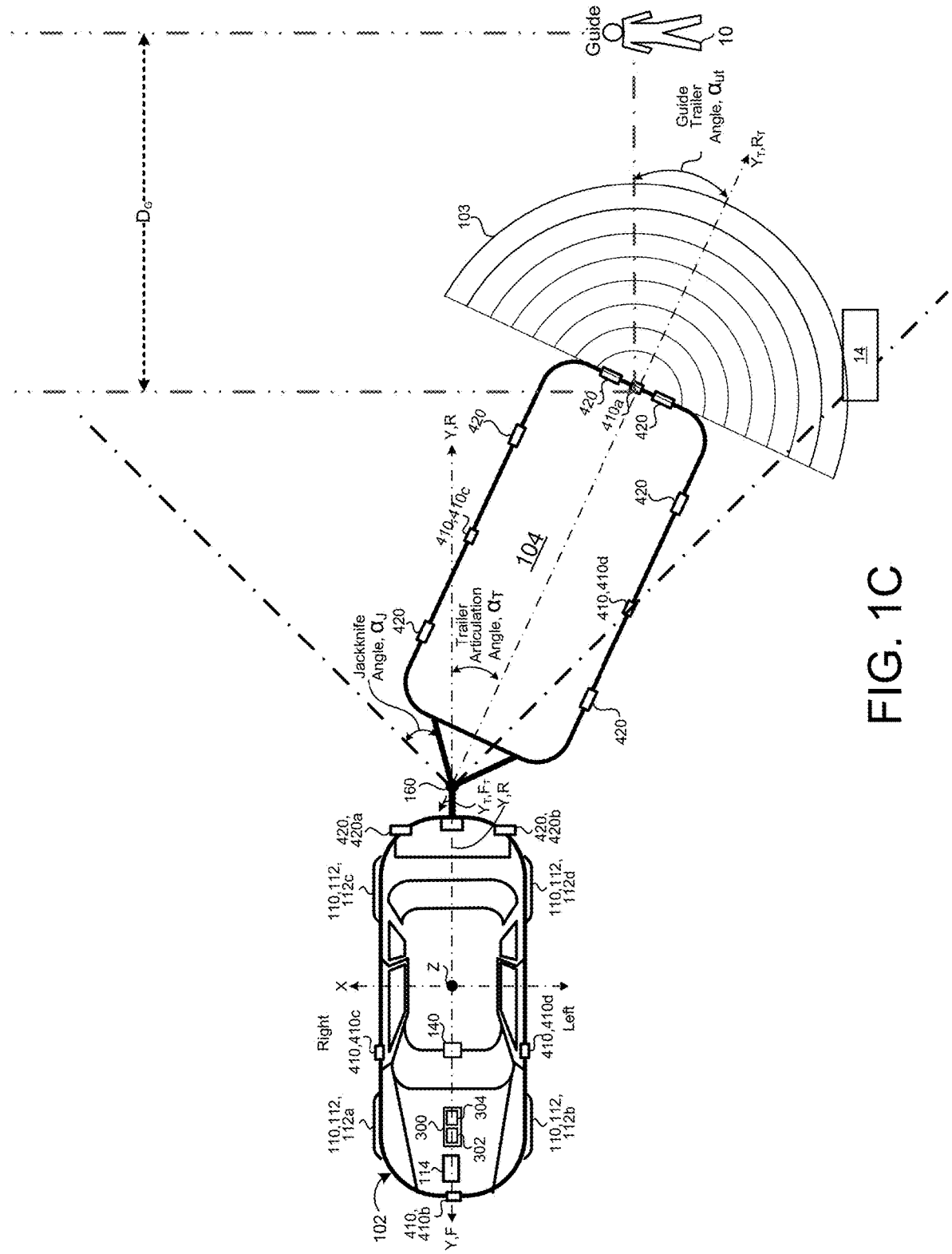
FIG. 1C is a schematic view of an exemplary vehicle-trailer system autonomously following a guide.

Referring to FIG. 1C, when the driver selects which guide 10 he/she wants the vehicle-trailer system 100 to drive towards, the follow-me system 310 plans a path (not shown) between the vehicle-trailer system 100 and the guide 10 based on the location of the selected guide 10 (determined by the TRA module 300 from the received sensor system data 402) relative to a position of the vehicle-trailer system 100 (e.g., orientation and distance). Based on the received images 412 the TRA module 300 determines a guide trailer angle $\alpha_{ut}$ being an angle between the trailer fore-aft axis $Y_T$ of the trailer 104 and the guide 10, while the trailer 104 maintains a minimum distance $D_G$ away from the guide 10. In addition, the TRA module 300 determines the trailer articulation angle $\alpha_T$ being the angle between the tow vehicle 102 and the trailer 104 about the hitch 160, based on the first and second distances $D_1$, $D_2$. Based on the determined user trailer angle $\alpha_{ut}$, and first and second distances $D_1$, $D_2$, and the minimum distance $D_G$ away from the guide 10, the TRA module 300 determines a rearward path for the vehicle-trailer system 100 to follow while maintaining the minimum distance $D_G$ away from the guide 10 and preventing jackknife between the vehicle 102 and the trailer 104. For example, if the first or second distance $D_1$, $D_2$ is greater than a threshold value, then the TRA module 300 determines that the vehicle-trailer system 100 is approaching or is at a jackknife angle $\alpha_J$. In such a case, the TRA module 300 adjusts the path to prevent jackknifing.

As the vehicle-trailer system 100 is autonomously backing up towards the selected guide 10, the sensor system 400 is continuously capturing images 412 and sensor data 422. Therefore, the TRA module 300 continuously determines the user trailer angle $\alpha_{ut}$ and the trailer articulation angle $\alpha_T$, and continuously updates the planned rearward path. In addition, the TRA module 300 continuously updates the planned path because the guide 10 may be moving rearward as the vehicle-trailer system 100 is following the guide 10.

In some implementations, the TRA module 300 determines a speed of the guide 10 based on the sensor data 402. The TRA module 300 determines a vehicle-trailer speed of the vehicle-trailer system 100 to maintain the minimum distance $D_G$ between the guide 10 and the vehicle-trailer system 100.

In some examples, the sensor system 400 identifies one or more objects 14 along the planned path and sends the TRA module 300 data relating to the position of the one or more objects 14. In some examples, the objects 14 are within a predetermined area 103 behind the trailer 104. In this case, the TRA module 300 may recalculate the planned path to avoid the one or more objects 14. In some examples, the TRA module 300 determines a probability of collision and if the probability of collision exceeds a predetermined threshold, the TRA module 300 adjusts the path and sends it to the follow-me system 310. The predetermined area 103 may be an area within the field-of-view of the rear camera 410a. In some examples, the predetermined area 103 has semi-circular shape with its center being the location of the rear camera 410a. The predetermined area 103 may have other shapes as well.

While the vehicle-trailer system 100 is autonomously driving rearward R, $R_T$, the driver may press the brakes of the brake system 120 causing the follow-me system 310 to stop executing the follow-me behaviors 320, 320a-c. Other driver actions may be available to stop executing the follow-me behaviors 320, 320a-c.

Once the TRA module 300 plans or updates the rearward path, the follow-me system 310 is configured to execute behaviors that cause the drive system 110 to autonomously follow the planned path. Therefore, the follow-me system 310 includes one or more behaviors 320a-320c that once executed allow for the autonomous driving of the vehicle-trailer system 100 along the planned path. The behaviors 320a-320c may include, but are not limited to a braking behavior 320a, a speed behavior 320b, and a steering behavior 320c.

The braking behavior 322 may be executed to either stop the vehicle-trailer system 100 or to slow down the vehicle-trailer system 100 based on the planned path. The braking behavior 322 sends a signal or command 306 to the drive system 110, e.g., the brake system 120, to either stop the vehicle-trailer system 100 or reduce the speed of the vehicle-trailer system 100.

The speed behavior 324 may be executed to change the speed of the vehicle-trailer system 100 by either accelerating or decelerating based on the planned path. The speed behavior 324 sends a signal or command 306 to the brake system 120 for decelerating or the acceleration system 130 for accelerating. In some examples, if the TRA module 300 determines vehicle-trailer speed based on the speed of the guide, then the TRA module 300 send commands 306 to the drive system 110 to adjust a current speed to the determined vehicle-trailer speed.

The steering behavior 326 may be executed to change the direction of the vehicle-trailer system 100 based on the planned path. As such, the steering behavior 326 sends the acceleration system 130 a signal or command 306 indicative of an angle of steering causing the drive system 110 to change direction. The angle of steering is determined based on the user trailer angle $\alpha_{ut}$, the trailer articulation angle $\alpha_T$.

Figure 3:
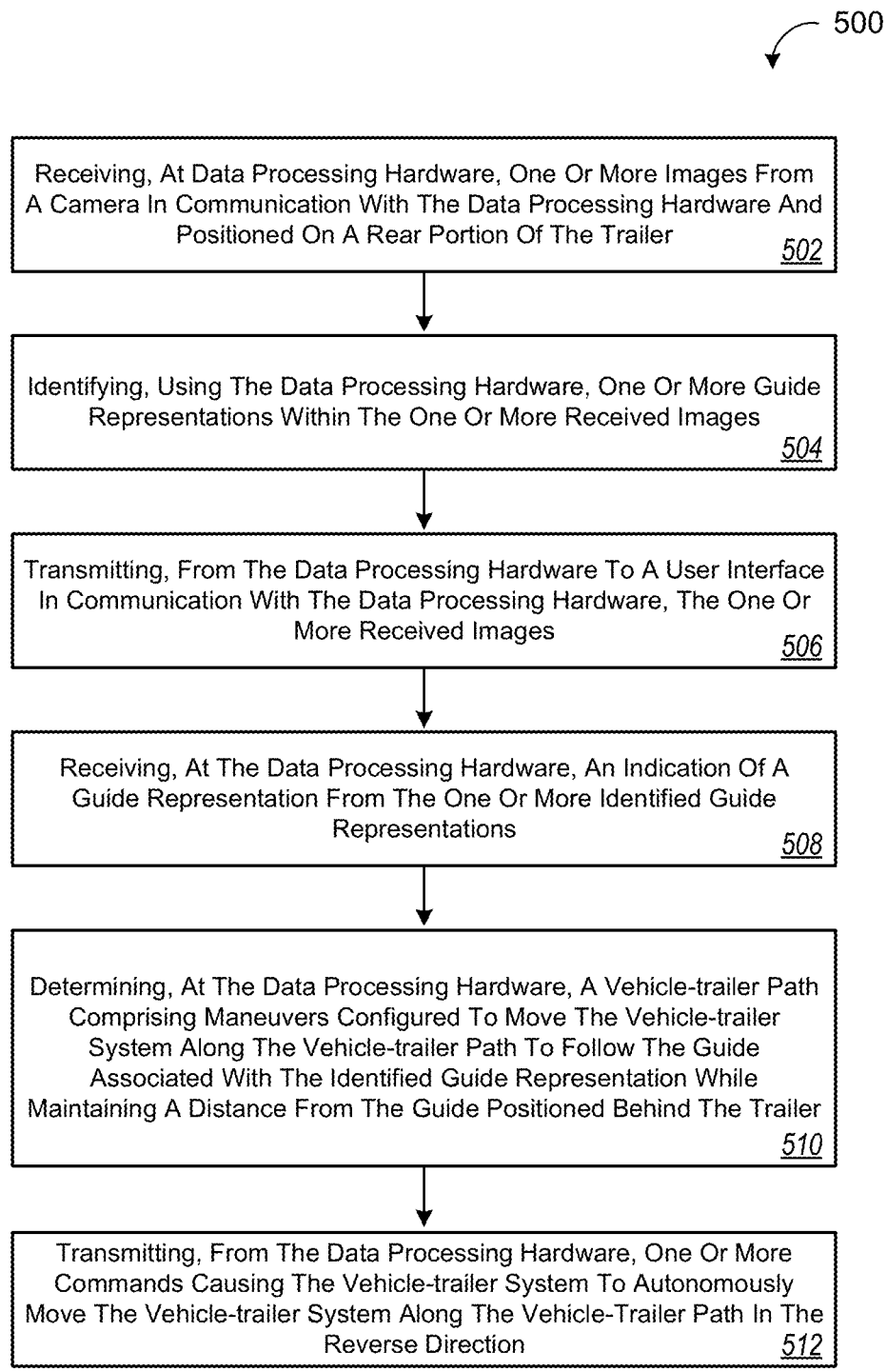
FIG. 3 is a schematic view of an exemplary arrangement of operations for a method of maneuvering a vehicle-trailer system in a reverse direction.

FIG. 3 provides an exemplary arrangement of operations for a method 500 of maneuvering in a reverse direction a vehicle-trailer system 100 described in FIGS. 1A-2. The vehicle-trailer system 100 included a vehicle 102 attached to a trailer 104 at a hitch 160.

At block 502, the method 500 includes receiving, at data processing hardware (i.e., TRA module 300), one or more images 412 from a camera 410a in communication with the data processing hardware 300 and positioned on a rear portion of the trailer 104. At block 504, the method 500 includes identifying, using the data processing hardware 300, one or more guide representations 146 within the one or more received images 412.

At block 506, the method 500 includes transmitting, from the data processing hardware 300 to a user interface 140 in communication with the data processing hardware 300, the one or more received images 412. At block 508, the method 500 includes, receiving, at the data processing hardware 300 from the user interface 140, a indication or selection 144 of an identified guide representation 146 from the one or more identified guide representations 146.

At block 510, the method 500 includes determining, at the data processing hardware 300, a vehicle-trailer path that includes maneuvers configured to move the vehicle-trailer system 100 along the vehicle-trailer path to the guide associated with the identified guide representation while maintaining a minimum distance $D_G$ from the guide 10 positioned behind the trailer 104. At block 512, the method 500 includes transmitting, from the data processing hardware 300 to a drive system 110 of the vehicle 102 (or the vehicle-trailer system 100), one or more commands causing the vehicle-trailer system 100 to autonomously move the vehicle-trailer system 100 along the determined path in the reverse direction.

In some examples, the method 500 further includes receiving, at the data processing hardware 300, vehicle sensor data 422 from one or more vehicle sensors 420 positioned on a back portion of the vehicle 102. The sensor data 422 indicative of a distance (e.g., first and second distances $D_1, D_2$) between the rear portion of the vehicle 102 and a front portion of the trailer 104. The method may further include determining, using the data processing hardware 300, a vehicle-trailer angle (i.e., trailer articulation angle $\alpha_T$) indicative of an angle between the vehicle 102 and the trailer 104 based on the received sensor data 422

In some example, determining the vehicle-trailer path includes: determining a guide trailer angle $\alpha_{ut}$ being an angle between a fore-aft axis $Y_T$ of the trailer and the guide 10; determining a position of the guide 10 being at a minimum distance $D_G$ away from the trailer 104; and determining the vehicle-trailer path based on the guide trailer angle $\alpha_{ut}$, the vehicle-trailer angle (i.e., the trailer articulation angle $\alpha_T$), and the minimum distance $D_G$.

The method 500 may include receiving, at the data processing hardware 300, trailer sensor data from 422 one or more trailer sensors 420 positioned on the rear portion of the trailer 104, side portions of the trailer 104, or the rear and side portions of the trailer 104; identifying, using the data processing hardware 300, one or more objects 14 within the determined vehicle-trailer path using the received trailer sensor data 402 (e.g., the data from the sensors 422 and the data from the images 412); and when one or more objects 14 are identified, adjusting the determined vehicle-trailer path to avoid the one or more objects 14. In some implementations, adjusting the determined vehicle-trailer path to avoid the one or more objects 14 includes determining an adjusted vehicle-trailer path that includes maneuvers configured to move the vehicle-trailer system along the vehicle-trailer path while maintaining a minimum distance $D_G$ from the guide positioned behind the trailer 104 and avoiding the one or more identified objects 14.

In some examples, the method 500 further includes determining, using the data processing hardware 300, a guide speed of the guide 10 using the received one or more images 412 and/or the one or more sensor data 422 from the sensors 420; determining, using the data processing hardware 300, a vehicle-trailer speed to maintain a minimum distance $D_G$ away from the guide 10; and transmitting, from the data processing hardware 300, one or more commands 306 to the drive system 110 of the vehicle 102 causing the vehicle-trailer system 100 to adjust a current vehicle-trailer speed to the determined vehicle-trailer speed along the determined vehicle-trailer path in the reverse direction.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, memory hardware, a composition of matter effecting a machine-readable propagated signal, or a combination of one or more of them. The terms "data processing apparatus", "data processing hardware", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for maneuvering a vehicle-trailer system in a reverse direction, the vehicle-trailer system having a vehicle attached to a trailer at a hitch, the method comprising:
receiving, at data processing hardware, one or more images from a camera in communication with the data processing hardware and positioned on a rear portion of the trailer;
identifying, using the data processing hardware, one or more guide representations within the one or more received images, each one of the one or more guide representations representing a person;
transmitting, from the data processing hardware to a user interface in communication with the data processing hardware, the one or more received images;
receiving, at the data processing hardware from the user interface, an indication representing a selection of one guide representation selected from the one or more guide representations;
determining, using the data processing hardware, a vehicle-trailer angle indicative of an angle between the vehicle and the trailer based on the received sensor data;
determining a guide trailer angle being an angle between a fore-aft axis of the trailer and the guide;
determining, at the data processing hardware, a vehicle-trailer path comprising maneuvers configured to move the vehicle-trailer system along the vehicle-trailer path to follow the guide associated with the indication while maintaining a minimum distance between the trailer and the guide positioned behind the trailer, the vehicle-trailer path based on the guide trailer angle, the vehicle-trailer angle, and the minimum distance; and
transmitting, from the data processing hardware to a drive system of the vehicle, one or more commands causing the vehicle-trailer system to autonomously move the vehicle-trailer system along the vehicle-trailer path in the reverse direction.

2. The method of claim 1, further comprising:
receiving, at the data processing hardware, vehicle sensor data from one or more vehicle sensors positioned on a back portion of the vehicle, the sensor data indicative of a distance between the rear portion of the vehicle and a front portion of the trailer;
wherein the vehicle-trailer angle is based on the received sensor data.

3. The method of claim 1, further comprising:
determining a position of the guide being at the minimum distance away from the trailer.

4. The method of claim 1, further comprising:
receiving, at the data processing hardware, trailer sensor data from one or more trailer sensors positioned on the rear portion of the trailer, side portions of the trailer, or the rear and side portions of the trailer;
identifying, using the data processing hardware, one or more objects within the determined vehicle-trailer path using the received trailer sensor data; and
when one or more objects are identified, adjusting the determined vehicle-trailer path to avoid the one or more objects.

5. The method of claim 4, wherein adjusting the determined vehicle-trailer path to avoid the one or more objects comprises:
determining an adjusted vehicle-trailer path comprising maneuvers configured to move the vehicle-trailer system along the vehicle-trailer path while maintaining the minimum distance from the guide positioned behind the trailer and avoiding the one or more identified objects.

6. The method of claim 1, further comprising:
determining, using the data processing hardware, a guide speed of the guide using the received one or more images;
determining, using the data processing hardware, a vehicle-trailer speed to maintain a minimum distance away from the guide; and
transmitting, from the data processing hardware, one or more commands to the drive system of the vehicle causing the vehicle-trailer system to adjust a current vehicle-trailer speed to the determined vehicle-trailer speed along the determined vehicle-trailer path in the reverse direction.

7. A system for maneuvering a vehicle-trailer system in a reverse direction, the vehicle-trailer system having a vehicle attached to a trailer at a hitch point, the system comprising:
data processing hardware;
hardware memory in communication with the data processing hardware, the hardware memory storing instructions that when executed on the data processing hardware cause the data processing hardware to perform operations comprising:
receiving one or more images from a camera in communication with the data processing hardware and positioned on a rear portion of the trailer;
identifying one or more guides within the one or more received images, each one of the one or more guide representations representing a person;
transmitting to a user interface in communication with the data processing hardware, the one or more received images;
receiving an indication representing a selection of one identified guide selected from the one or more identified guides;
determining a vehicle-trailer angle indicative of an angle between the vehicle and the trailer;
determining a guide trailer angle being an angle between a fore-aft axis of the trailer and the guide;
determining a vehicle-trailer path comprising maneuvers configured to move the vehicle-trailer system to follow the guide associated with the indication while maintaining a minimum distance between the trailer and the guide positioned behind the trailer, the vehicle-trailer path based on the guide trailer angle, the vehicle-trailer angle, and the minimum distance; and
transmitting one or more commands to a drive system of the vehicle, the one or more commands causing the vehicle-trailer system to autonomously move the vehicle-trailer system along the determined path in the reverse direction.

8. The system of claim 7, wherein the operations further comprise:
receiving vehicle sensor data from one or more vehicle sensors positioned on a back portion of the vehicle, the sensor data indicative of a distance between the rear portion of the vehicle and a front portion of the trailer;
wherein the vehicle-trailer angle is based on the sensor data.

9. The system of claim 7, wherein the operations further comprise:

determining a position of the guide being at the minimum distance away from the trailer.

10. The system of claim 7, wherein the operations further comprise:
   receiving trailer sensor data from one or more trailer sensors positioned on the rear portion of the trailer, side portions of the trailer, or the rear and side portions of the trailer;
   identifying one or more objects within the determined path; and
   when one or more objects are identified, adjusting the determined vehicle-trailer path to avoid the one or more objects.

11. The system of claim 10, wherein adjusting the determined vehicle-trailer path to avoid the one or more objects comprises:
   determining an adjusted vehicle-trailer path comprising maneuvers configured to move the vehicle-trailer system along the vehicle-trailer path while maintaining the minimum distance from the guide positioned behind the trailer and avoiding the one or more identified objects.

12. The system of claim 7, wherein the operations further comprise:
   determining a guide speed of the guide using the received one or more images;
   determining a vehicle-trailer speed based on the guide speed to maintain a minimum distance away from the guide; and
   transmitting one or more commands to the drive system of the vehicle causing the vehicle-trailer system to adjust a current vehicle-trailer speed to the determined vehicle-trailer speed along the determined path in the reverse direction.

\* \* \* \* \*